United States Patent
Lane

(10) Patent No.: US 8,749,377 B2
(45) Date of Patent: Jun. 10, 2014

(54) TEMPERATURE TRACKING DEVICE AND METHOD USING SAME

(75) Inventor: T Randall Lane, Lebanon, OH (US)

(73) Assignee: KLT Technology, Dayton, OH (US)

( * ) Notice: Subject to any disclaimer, the term of this patent is extended or adjusted under 35 U.S.C. 154(b) by 396 days.

(21) Appl. No.: 12/638,457

(22) Filed: Dec. 15, 2009

(65) Prior Publication Data

US 2011/0140830 A1    Jun. 16, 2011

(51) Int. Cl.
*G08B 1/08* (2006.01)

(52) U.S. Cl.
USPC ............ 340/539.26; 340/572.1; 340/572.8; 340/539.1; 340/539.27; 340/540; 340/584; 340/586; 229/92.8

(58) Field of Classification Search
CPC ... G06Q 10/08; G06Q 10/087; G06Q 20/203; G06Q 10/10; G06Q 10/20; G06Q 10/0875; G06Q 20/102; G06Q 30/0241; G06Q 30/04; G06Q 50/32; G06K 17/0022; G06K 19/0723; G06K 2017/0045; H04B 17/00; H04B 1/0466; H04B 1/0483; H04B 5/0025; H04B 7/18515; B42D 15/08; B42D 15/026; B42D 15/045; B42D 15/085; B42D 15/025; B42D 15/008; B42D 15/042; B42D 1/003; B42D 1/004; B42D 2035/24
USPC ............ 340/572.1–572.9, 500, 531, 539.1, 340/539.22, 539.26–539.29, 540, 601, 602, 340/588, 3.1, 584, 586; 229/92.8, 68.1, 229/300–306; 40/124.01–124.191
See application file for complete search history.

(56) References Cited

U.S. PATENT DOCUMENTS

| | | | | |
|---|---|---|---|---|
| 4,972,099 A * | 11/1990 | Amano et al. | ................ | 382/313 |
| 5,178,389 A * | 1/1993 | Bentley et al. | .................. | 463/29 |
| 5,526,409 A * | 6/1996 | Conrow et al. | ........... | 379/91.02 |
| 6,712,276 B1 * | 3/2004 | Abali et al. | .................... | 235/492 |
| 7,002,451 B2 * | 2/2006 | Freeman | .................... | 340/10.51 |
| 7,299,990 B2 * | 11/2007 | Hoshina | ....................... | 235/492 |
| 7,598,869 B2 * | 10/2009 | Kumagai et al. | ........... | 340/572.1 |
| 7,845,569 B1 * | 12/2010 | Warther et al. | ................ | 235/492 |
| 8,341,752 B2 * | 12/2012 | Naressi et al. | .................. | 726/27 |
| 8,608,566 B2 * | 12/2013 | Guinchard et al. | ............ | 463/38 |
| 2001/0042055 A1 * | 11/2001 | Didriksen et al. | ............ | 705/407 |
| 2003/0146847 A1 * | 8/2003 | Swetlik et al. | ........... | 340/870.15 |
| 2004/0084631 A1 * | 5/2004 | Spoonhower et al. | ..... | 250/474.1 |
| 2005/0034420 A1 * | 2/2005 | Radlinger et al. | ................ | 53/52 |
| 2005/0177480 A1 * | 8/2005 | Huang | ............................ | 705/34 |
| 2005/0267806 A1 * | 12/2005 | Tano | ............................. | 705/14 |
| 2006/0091671 A1 * | 5/2006 | Raming | ........................ | 283/105 |
| 2006/0190107 A1 * | 8/2006 | Kassar et al. | ................... | 700/90 |
| 2007/0078559 A1 * | 4/2007 | Rosen | ............................ | 700/220 |
| 2008/0111674 A1 * | 5/2008 | Quine | .......................... | 340/501 |
| 2009/0108994 A1 * | 4/2009 | Keeton et al. | ................ | 340/10.1 |

FOREIGN PATENT DOCUMENTS

CA         2483193        4/2003

* cited by examiner

*Primary Examiner* — Steven Lim
*Assistant Examiner* — Ryan Sherwin
(74) *Attorney, Agent, or Firm* — R. William Graham

(57) ABSTRACT

A device, system and method for monitoring conditions within an environment in which an item is disposed includes a reusable environment monitoring tag operably connected to a return postcard that can be disposed adjacent an item to be monitored, the tag equipped to sense and store surrounding environmental conditions thereof and an electronic reader electronic reader which upon receipt of the a return postcard having the tag therein in a predetermined range receives environmental data sensed and stored by the tag and analyze the data. The method includes mailing the return postcard to a receiving site for reading.

10 Claims, 2 Drawing Sheets

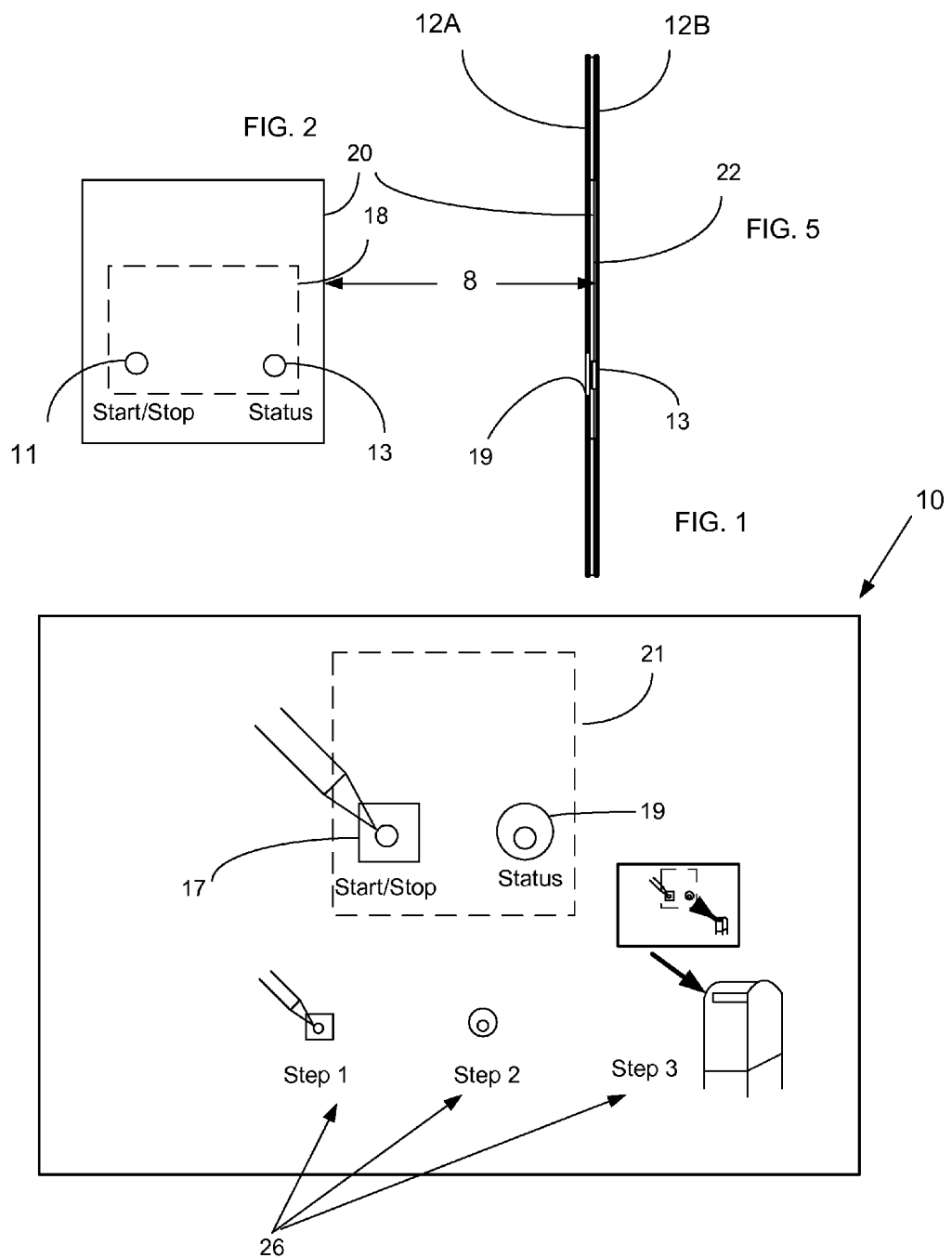

TEMPERATURE TRACKING DEVICE AND METHOD USING SAME

FIELD OF INVENTION

The present device relates to reusable environment monitoring tags. More particularly, but not by way of limitation, the invention relates to environment monitoring device disposed with and to sense the internal environment of an article contained in a package including but not limited to temperature, vibration, pressure, radiation, shock, light, position and atmosphere.

BACKGROUND OF THE INVENTION

Prior devices for monitoring conditions within an environment in which an article is contained exist. For example, such devices typically monitor, record and download the temperature history of package content in transit. Recorded data is currently downloaded with the aid of the party receiving the device shipped with the article. This creates a burden on the recipient and shipper to follow up on these tracking devices which in the case of pharmaceuticals, for example, have strict government regulations requiring temperature monitoring. Currently, computer based devices are required to be deployed at the recipient's location where the tags can be inserted into a reader and data transmitted to the shipper.

The current method and system for monitoring such conditions is lacking. There is a need to improve the system, device and method for monitoring conditions of an article contained in an environment.

SUMMARY OF THE INVENTION

It is an object to improve monitoring of conditions of an article contained in an environment.

It is a further object to provide an improved device and method for monitoring conditions within an environment in which an article is disposed.

Accordingly, the present invention is directed to a device for monitoring conditions within an environment in which an article is disposed. The device includes a reusable environment monitoring tag operably connected to a return postcard that can be disposed adjacent a product, package, article or container to sense internal environment of the same including but not limited to temperature, vibration, pressure, radiation, shock, light, position and atmosphere. The tag can preferably be operably disposed within two card substrates, wherein an outer surface of one substrate includes printed address indicia to enable the recipient to simply drop the device into the mail for purposes of the same to be delivered to a tag information retrieval center.

The invention is also directed to a system which includes a reusable environment monitoring tag operably connected to a return postcard that can be disposed adjacent a product, package, article or container to sense internal environment of the same including but not limited to temperature, vibration, pressure, radiation, shock, light, position and an electronic reader which upon receipt of the a return postcard having the tag therein is equipped to receive environmental data sensed by the tag and analyze the data.

The invention also is directed to a method for monitoring conditions within an environment in which an article is disposed. The method includes the steps of providing a reusable environment monitoring tag operably connected to a return postcard that can be disposed adjacent a product, package, article or container to sense internal environment of the same including but not limited to temperature, vibration, pressure, radiation, shock, light, position, disposing the tag and postcard adjacent a product, package, article or container in a manner to sense internal environment; providing the tag and postcard and product, package, article or container to a recipient; removing the tag and postcard; and forwarding the tag and postcard to an electronic reader which upon receipt of the a return postcard having the tag therein is equipped to receive environmental data sensed by the tag and analyze the data.

The proposed invention also permits the use of such postcard tag device in food grade and pharmaceutical grade environments by enclosing the same in a continuous waterproof barrier of food grade plastic or other material separating the electronics and other components of the tag from the environment. The barrier can be a separate or an integral part of the postcard.

The present invention will be described in greater detail herein and with reference to the drawings.

BRIEF DESCRIPTION OF THE DRAWINGS

FIG. 1 depicts a front view of a device of the invention.
FIG. 2 shows in a tag used in the device of FIG. 1.
FIG. 5 is a sectional view through FIG. 1.

DETAILED DESCRIPTION OF THE PREFERRED EMBODIMENTS

Figure 3:
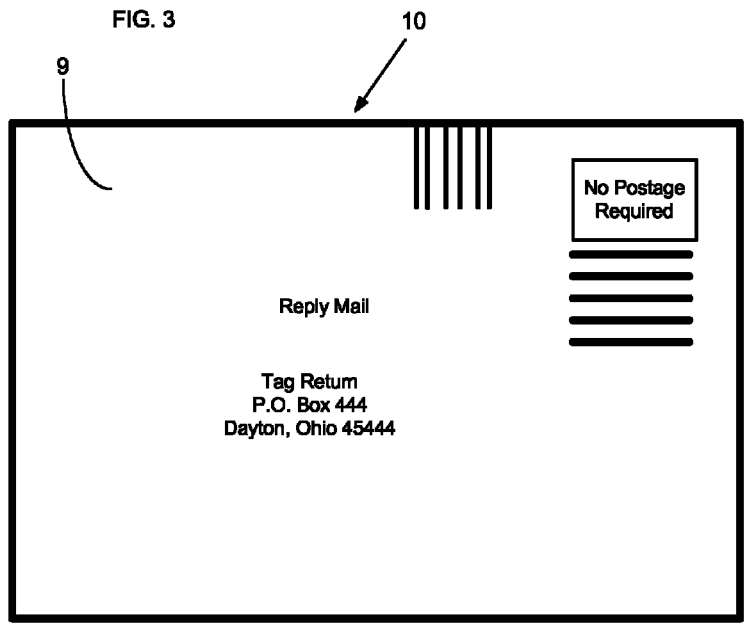
FIG. 3 depicts a back view of a device of the invention.
Figure 4:
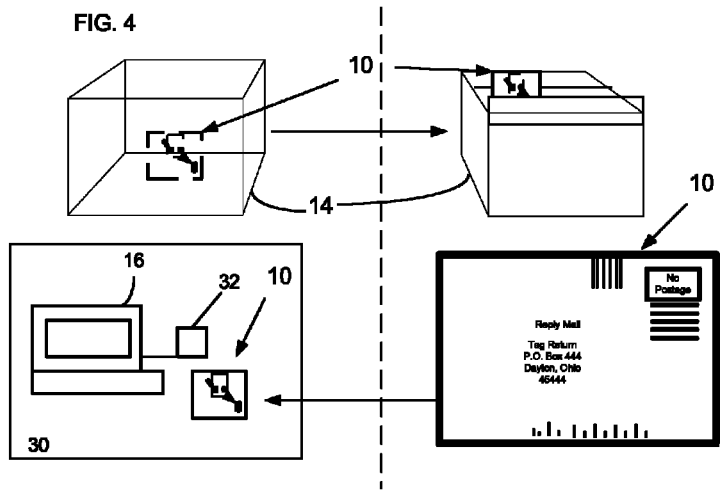
FIG. 4 depicts a system and method of the invention.

Referring to FIG. 1, a reusable environment monitoring tag 8 is operably connected to a return postcard 9 which together form the device 10. Preferably, the tag 8 can be operably disposed between a pair of substrates 12A and 12B which can be a paper substrate or other printable substrate. The device 10 can be disposed adjacent a product, package, article or container 14 to sense internal environment of the same including but not limited to temperature, vibration, pressure, radiation, shock, light, position. An electronic reader computer based device 16 can be provided to aid in receiving the data which is stored on the device 10 upon receipt of the a return postcard 9 having the tag 8 thus permitting the environmental data sensed by the tag 8 to be analyzed. The substrates 12A and 12B can preferably be such to permit printed indicia thereon and can also include a protective coating to aid in protecting the tag 8.

The environment monitoring tag 8 includes electronic components mounted on a substrate 18 which can preferably be covered by a layer of protective foam 20 over which is located an ESD layer 22 to reduce static buildup. The sandwich comprising tag 8, foam 20 and ESD layer 22 is inserted in between substrates 12A and 12B which can form an envelope. The substrates 12A and 12B can include food or pharmaceutical grade heat sealable flexible plastic and be sealed together by heat and pressure applied to a perimeter of the sandwich sealing the elements into a waterproof unit. The proposed invention also permits the use of such postcard tag device 10 in food grade and pharmaceutical grade environments by enclosing the same in a continuous waterproof barrier of food grade plastic or other material separating the electronics and other components of the tag 8 from the environment. The barrier can be a separate or an integral part of the postcard. The tag 8 is of a size that allows for integration into a postcard 9 as seen in the drawings. Preferably, the device can be manufactured in a manner to provide for its reuse. In this regard, the device 10 can include a rechargeable or renewable source or a power source with a long life so that multiple uses can be made with a single device 10.

The device 10 can then be inserted into a package 14 which can contain food or medication, for example, without concern for contamination and can monitor the environment within the package 14 in the manner known in the prior art. The tag 8 is formed with components known in art to perform the monitoring of conditions. The present invention contemplates providing tag 8 with a start/stop button 11 and status indicator 13 in predetermined fixed positions on tag 8. The start/stop button 11 starts and stops monitoring by the tag 8 and the status button 11 can be an LED which blinks to indicate operation, for example, a red light indicating the device has been stopped.

Postcard 9 is provided with cutout portions 17 and 19 as seen in FIG. 5. The tag 8 can be adhesively connected for example to a predetermined area 21 of an inside surface of substrates 12A and 12B as represented by dashed line. In this way, the start/stop button 11 and status indicator 13 can be positionably maintained within respective cutout portions 17 and 19 for aiding in carrying out the invention.

When polled by an RF field generated by an interested party, such as a party located at the device 10 return site 30, the environmental data are transmitted through the postcard 9 to RF reader 32 to be utilized in assessing the history of the environment within package 14. The invention provides a system which includes reusable environment monitoring tag 8 operably connected to a return postcard 9 that can be disposed adjacent a product, package, article or container 14 to sense internal environment of the same including but not limited to temperature, vibration, pressure, radiation, shock, light, position and an electronic reader 32 associated with computer 16 which upon receipt of the a return postcard 9 having the tag 8 therein is equipped to receive environmental data sensed by the tag and analyzes the data.

A method for monitoring conditions within an environment in which an article is disposed is provided. The method includes the steps of providing the reusable environment monitoring tag 8 operably connected to a return postcard 9 that can be disposed adjacent a product, package, article or container 14 to sense internal environment of the same including but not limited to temperature, vibration, pressure, radiation, shock, light, position, disposing the tag and postcard adjacent a product, package, article or container 14 in a manner to actively sense internal environment; providing the tag and postcard 10 and product, package, article or container 14 to a recipient; removing the tag and postcard 10; turning off the sensor of the tag 8; and forwarding the tag and postcard 10 to an electronic reader 32 which upon receipt of the a return postcard 9 having the tag 8 therein is equipped to receive environmental data sensed by the tag 8 and analyze the data for purposes of determining compliance of a predetermined condition. To aid in this regard the postcard 9 is preprinted with indicia 26 which can include steps of instructing the receiver to use a pen or pencil tip to press the stop button 11 (step 1), then check the status indicator 13 to if a red light is blinking (step 2) and finally placing the device 10 in a mailbox (step 3).

Return postcard 9 seen in FIG. 3 adheres to US mail standards wherein a U.S. postcard and accordingly has size within a maximum and minimum size provided by the United States Postal Service and a maximum and minimum thickness provided by the United States Postal Service as wet forth below. The following table gives the specifications in both inches and millimetres (cm dimensions can be calculated by dividing mm by 10).

| Size | Length × height (in) | Length × height (mm) | Thickness (in) | Thickness (mm) |
|---|---|---|---|---|
| maximum | 6 × 4.25 | 152.4 × 107.9 | 0.016 | 0.406 |
| minimum | 5 × 3.5 | 127.0 × 88.9 | 0.007 | 0.178 |

The thickness specifications for the US postcard equates to a basis weight of 39lb to 105lb bond stock, 55lb to 145lb cover stock (card stock) or 145 gsm to 390 gsm.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A device for monitoring conditions within an environment in which an item is disposed, which includes: a reusable environment monitoring tag positionally connected and integrated into a return mail postcard using an adhesive, wherein said postcard can be disposed adjacent an item to be monitored, said tag equipped with a power source to sense surrounding environmental conditions thereof wherein said tag is of a size and configuration to become part of said return mail postcard adhering to US mail standards, wherein said tag is disposed within opposing substrates which are sealably connected to form said return mail postcard and said tag has a start/stop button and status indicator in predetermined fixed positions thereon and said return mail postcard is provided with a cutout portion and said tag connected to a predetermined area of an inside surface of said substrates to positionably maintain said start/stop button and said status indicator within said cutout portion and not extending beyond said substrates.

2. The device for monitoring of claim 1, wherein said return mail postcard includes an outer surface having printed address indicia to enable the device to be placed into the mail for purposes of the same to be delivered to a tag information retrieval center.

3. The device for monitoring of claim 1, wherein said tag is equipped to monitor one of temperature, vibration, pressure, radiation, shock, light, position and atmosphere.

4. A system for monitoring conditions within an environment in which an item is disposed, which includes: a reusable environment monitoring tag connected to a return mail postcard that can be disposed adjacent an item to be monitored, said tag equipped with a power source to sense and store surrounding environmental conditions thereof including one of temperature, vibration, pressure, radiation, shock, light, position and atmosphere, wherein said tag is of a size and configuration to become part of said return mail postcard and wherein said tag is disposed within opposing substrates which are sealably connected to form said return mail postcard adhering to US mail standards and said tag has a start/stop button and status indicator in predetermined fixed positions thereon and said return mail postcard is provided with a cutout portion and said tag connected to a predetermined area of an inside surface of said substrates to positionably maintain said start/stop button and said status indicator within said cutout portion and not extending beyond said substrates; and an electronic reader which upon receipt of the return mail postcard having the tag therein in a predetermined range receives environmental data sensed and stored by said tag and analyze the data.

5. The system for monitoring of claim 4, wherein said return mail postcard includes an outer surface having printed address indicia to enable the tag to be placed into the mail for purposes of the same to be delivered to a tag information retrieval center.

6. A method for monitoring conditions within an environment in which an item is disposed, which includes the steps of: (a) providing a reusable environment monitoring tag with a power source and is positionally connected and integrated into a return mail postcard using an adhesive for sensing one of temperature, vibration, pressure, radiation, shock, light, position and atmosphere, wherein said return mail postcard can be disposed adjacent the item to sense an environment surrounding the item wherein said tag is of a size and configuration to become part of said return mail postcard and wherein said tag is disposed within opposing substrates which are sealably connected to form said return mail postcard adhering to US mail standards and said tag has a start/stop button and status indicator in predetermined fixed positions thereon and said return mail postcard is provided with a cutout portion and said tag connected to a predetermined area of an inside surface of said substrates to positionably maintain said start/stop button and said status indicator within said cutout portion and not extending beyond said substrates; (b) disposing the tag and the return mail postcard adjacent the item in a manner to sense the environment surrounding the item; (c) providing the tag and the return mail postcard and item to a recipient; (d) obtaining the tag and return mail postcard from the environment surrounding the item and actuating the tag in a manner to stop further sensing; and (e) forwarding the tag and the return mail postcard to an electronic reader which upon receipt thereof is equipped to receive environmental data sensed by the tag and analyzes the data.

7. The method for monitoring of claim 6, wherein said return mail postcard includes an outer surface having printed address indicia to enable the tag to be placed into the mail for purposes of the same to be delivered to a tag information retrieval center.

8. The method for monitoring of claim 7, wherein said return mail postcard with said tag are mailed back to the tag information retrieval center.

9. The method for monitoring of claim 6, which includes to the step (f) of employing the reader and reading the tag.

10. The method for monitoring of claim 9, which subsequent to step (f) includes to the step (g) of actuating the tag in a manner to start further sensing for another item and repeating steps (a)-(e).

* * * * *